United States Patent
Waehner

(10) Patent No.: US 7,064,778 B1
(45) Date of Patent: Jun. 20, 2006

(54) MULTI-CAMERA SYSTEM FOR IMPLEMENTING DIGITAL SLOW SHUTTER VIDEO PROCESSING USING SHARED VIDEO MEMORY

(75) Inventor: Glenn C. Waehner, Fresno, CA (US)

(73) Assignee: Pelco Incorporated, Clovis, CA (US)

( * ) Notice: Subject to any disclaimer, the term of this patent is extended or adjusted under 35 U.S.C. 154(b) by 855 days.

(21) Appl. No.: 09/658,177

(22) Filed: Sep. 8, 2000

Related U.S. Application Data

(60) Provisional application No. 60/153,438, filed on Sep. 10, 1999.

(51) Int. Cl.
*H04N 5/232* (2006.01)

(52) U.S. Cl. .................. 348/211.11; 348/211.5

(58) Field of Classification Search ............ 348/211.5, 348/211.11, 211.1, 434.1, 435.1, 495, 423.1
See application file for complete search history.

(56) References Cited

U.S. PATENT DOCUMENTS

| | | | |
|---|---|---|---|
| 4,191,969 A * | 3/1980 | Briand et al. ............... 348/478 |
| 4,198,656 A | 4/1980 | Mathisen .................... 358/127 |
| 4,584,613 A * | 4/1986 | Amari et al. ................. 386/38 |
| 4,745,479 A | 5/1988 | Waehner ..................... 358/183 |
| 4,951,143 A | 8/1990 | Waehner ..................... 358/160 |
| 4,996,497 A | 2/1991 | Waehner ..................... 330/151 |
| 5,220,254 A | 6/1993 | Waehner ..................... 315/403 |
| 5,517,236 A * | 5/1996 | Sergeant et al. ............ 348/143 |
| 5,526,050 A * | 6/1996 | King et al. ............... 348/386.1 |
| 5,583,796 A * | 12/1996 | Reese ......................... 702/185 |
| 5,821,995 A * | 10/1998 | Nisikawa ................. 348/211.5 |
| 6,573,931 B1 * | 6/2003 | Horii et al. ............ 348/211.14 |

FOREIGN PATENT DOCUMENTS

JP   09-130668   *   5/1997

OTHER PUBLICATIONS

English translation of JP-09-130668.*
H. Kruegle, *CCTV Surveillance, Video Practices and Technology*, (© 1995, Butterworth-Heinemann) pp. 29, 33, 141-146, and 234-240.

* cited by examiner

*Primary Examiner*—Ngoc-Yen Vu
*Assistant Examiner*—James M. Hannett
(74) *Attorney, Agent, or Firm*—Michaelson & Associates; Peter L. Michaelson

(57) ABSTRACT

A technique, specifically a method and apparatus that implements the method, that allows a memory to be located remotely from a video source. Specifically, the method provides a write control signal between a video source and a remote memory that allows the remote memory to provide a video image during slow-shutter operation of the camera.

37 Claims, 12 Drawing Sheets

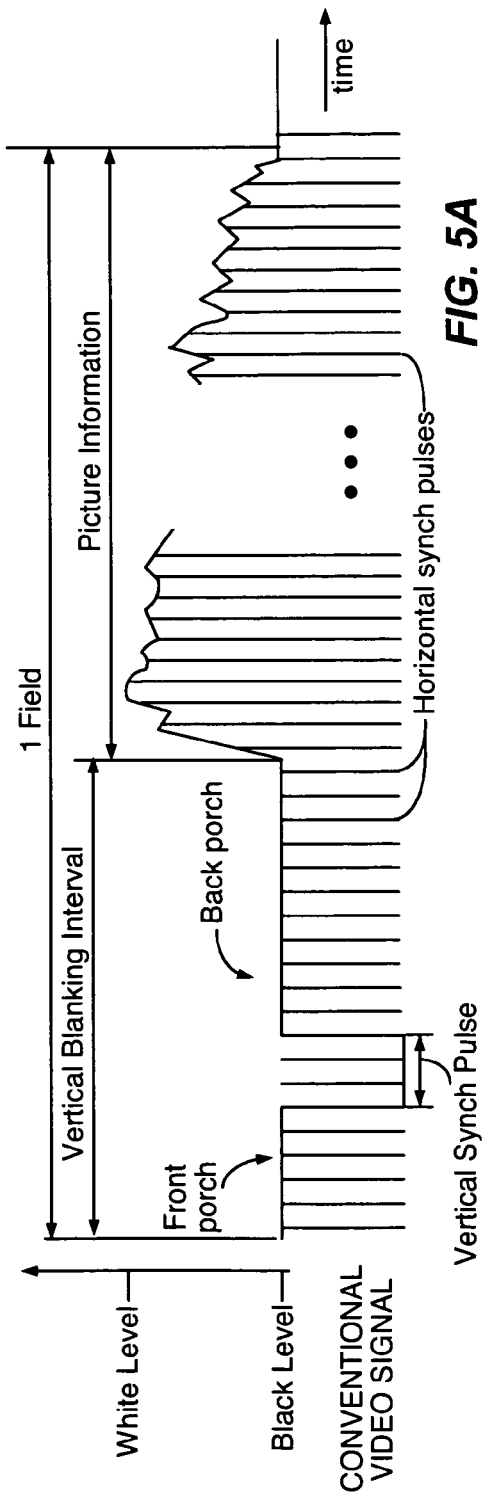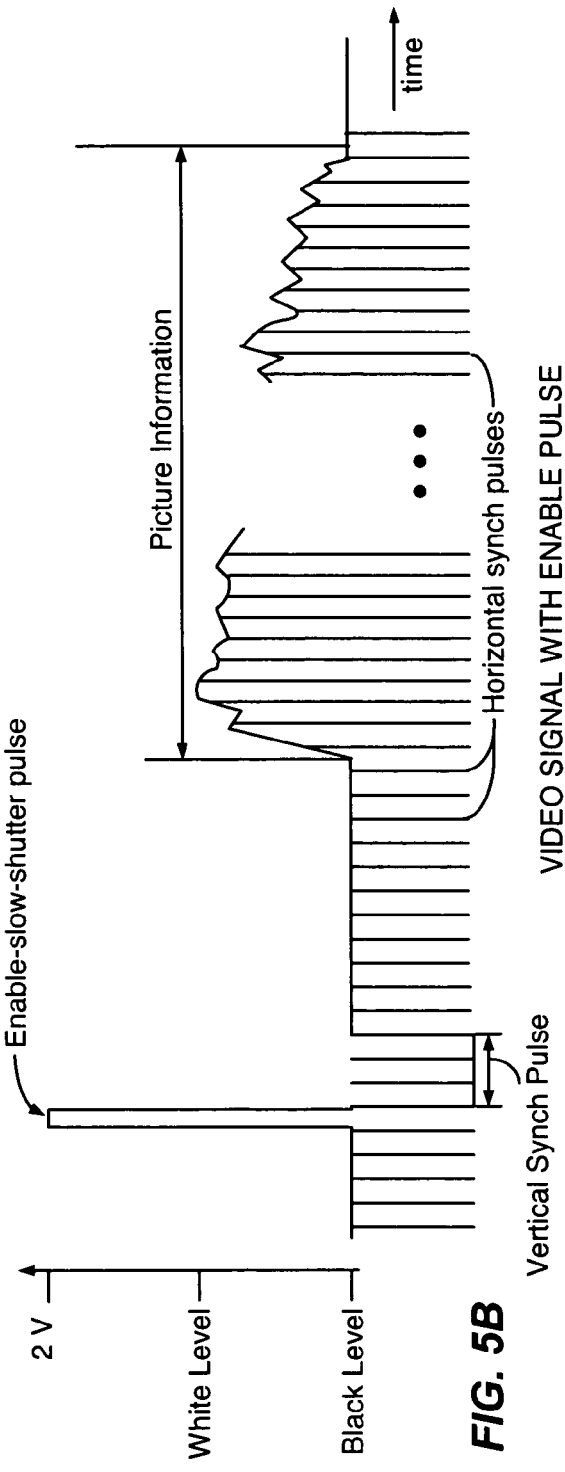

VIDEO SIGNAL WITH DON'T-WRITE PULSE

GENERATE DON'T WRITE SIGNAL CIRCUIT

DIGITAL VIDEO MEMORY WITH THE DETECT-DON'T-WRITE SIGNAL CIRCUIT

MULTI-CAMERA SYSTEM FOR IMPLEMENTING DIGITAL SLOW SHUTTER VIDEO PROCESSING USING SHARED VIDEO MEMORY

The present application claims priority to U.S. Provisional Patent Application Ser. No. 60/153,438 entitled Integrated Video Processing and Image Enhancement System, filed Sep. 10, 1999 which is incorporated by reference herein for all purposes.

BACKGROUND OF THE DISCLOSURE

1. Field of the Invention

The invention relates to a video system, and more particularly, to a method and apparatus for remote digital slow shutter video processing of video signals in a video system. This method is particularly, though not exclusively, suited for use in video surveillance systems.

2. Description of the Prior Art

In video surveillance situations, it is oftentimes desirable to monitor a number of remote locations, such as entrances and exits of a building or stations along a production line, from a centralized monitoring location. For these situations, separate video cameras are stationed at each respective location to produce a view of the monitored location. If the view on each camera changes slowly, it is possible to use a single monitor to display on a time-shared basis the images produced by the cameras.

A conventional television system transmits a video signal containing a series of vertical synchronization (synch) pulses which occur approximately every $\frac{1}{60}$th of a second ($\frac{1}{50}$th of a second in Europe). The vertical synch pulses provide timing information for the vertical sweep or deflection signal used to scan a cathode ray tube (CRT) to reconstruct the complete video image. If a vertical synch pulse is missed, the vertical sweep circuit responsive to the vertical synch pulses will come "out-of-lock" with the vertical synch pulses. An amount of time lasting through many vertical synch pulse intervals is often required for the vertical sweep circuit to re-lock onto the incoming vertical synch pulses. In addition, a conventional alternating current (AC) coupled sweep amplifier that drives the CRT is upset by the non-repetitive sweep input and hence rings and bounces for many vertical fields. During this transient, a blank bar is produced across the display of the television receiver or monitor, and the location of the image being displayed on the receiver or monitor bounces and rolls across the screen.

A camera uses an image sensor to acquire an image. The image sensor may be a tube-type sensor or solid-state sensor. The image sensors are typically designed to operate in daylight. In low light conditions, the image sensor may not receive sufficient light to produce a visually acceptable image in $\frac{1}{60}$th of a second. To compensate, the shutter speed may be slowed to increase the exposure time of the image sensor. However, reducing the shutter speed results in the transmission of a new image at intervals exceeding $\frac{1}{60}$th of a second and will result in a non-standard video format and synch pulses. In addition, the displayed image may flicker.

It has been demonstrated that a digital refresh memory can be built into a camera to provide the display refresh function to improve the video system's performance under low light conditions. In order to provide a sufficient amount of light to the image sensor, the shutter speed of the camera is reduced. The camera includes an analog-to-digital converter to digitize the signal from the image sensor, which is then stored in the refresh memory. The refresh memory stores picture element (pixel) data representative of the input signal. Typically, the refresh memory is a dual-port random-access memory (RAM) that, for example, is of sufficient size to store the pixels of a complete television (TV) frame, that is, two interleaved fields. The refresh memory is updated at the shutter speed of the camera, while the pixel data is read from the refresh memory every $\frac{1}{60}$th of a second. The image data read from the refresh memory is converted to analog form, and transmitted with a vertical synch pulse as an analog video signal. In this way, cameras provide video images of sufficient quality under low light conditions, and continue to supply standard rate ($\frac{1}{60}$th of a second) vertical synch pulses.

Providing a refresh memory in every camera of a video system is expensive. With the introduction of advanced digital processing techniques, the video pictures generated by the cameras are processed digitally in order to store or resynchronize the image. Consequently, digital memories having large storage capacity and high input and output data rates are required. However, large memories with fast data rates are generally costly. For example, a typical video surveillance system may have 500 cameras and a much smaller number of displays. Including a refresh memory in each of the 500 cameras incurs a significant cost.

Video surveillance systems, such as closed-circuit television (CCTV) systems generally include components that are designed to provide a specific complete self-contained function, such as cameras and monitors. However, cost and performance improvements can be achieved by placing some camera and monitor functions in a central location.

Therefore, there is a need for a method and apparatus to provide an effective slow shutter capability in a video system at a reduced cost. The method and apparatus should also operate with existing video components.

SUMMARY OF THE INVENTION

These shortcomings and limitations are obviated in accordance with the present invention, by providing at least one digital video memory in a remote location from the cameras, and sharing the digital video memory among all or at least a subset of the cameras.

A method and apparatus that implements the method allows the digital video memory to be located remotely from a video source. Specifically, the method provides at least one control signal between a video source and a remote digital video memory such that the digital video memory is updated with valid image information to provide a video signal for display. In an alternate embodiment, the method provides bidirectional control signals between the video source and the remote digital video memory.

In one aspect of the invention, a separate matrix switch is coupled to the remote digital video memory. In another aspect of the invention, the digital video memory is integrated into the matrix switch. In yet another aspect of the invention, a separate multiplexer is coupled to the remote digital video memory. In another aspect of the invention, the digital video memory is integrated into a multiplexer.

In an alternate aspect of the invention, the digital video memory transmits a control signal to inform the camera that the digital video memory is present, and that digital slow shutter video data can be sent. In other words, when it gets dark, the camera can enter digital slow shutter mode. The digital video memory is also responsive to a don't write signal such the data already stored in the digital video memory is maintained, and not updated. In this way, the camera continues to send synch pulses to maintain synchronization, and the video information (or absence of) associated with the don't write signal is not stored in the digital video memory.

In another aspect of the invention, a camera is responsive to the control signal that informs the camera of the presence of the digital video memory to enable remote slow shutter operation. The camera, when operating in slow shutter mode, transmits a don't-write signal to inform the receiver that a video image should not be used. In this way, when the camera is operating in slow-shutter mode and image information is not being received from the image sensor every 1/60th of a second, synchronization is maintained by sending a video signal, including the don't-write signal with invalid image information. The don't-write signal causes the invalid image information to be effectively discarded, and not stored in the digital video memory. Another feature of this approach is that conventional cameras and other video sources will automatically be accepted by the memory and displayed on the monitor.

In yet another aspect of the invention, a method and apparatus provides for a unidirectional control signal between a video source and a remote digital video memory. In this embodiment, a camera is enabled to operate in slow shutter mode, manually, by a switch.

In another aspect of the invention, a method provides a unidirectional control signal from a video source and to remote digital video memory such that the digital video memory is updated only with valid image information to provide a video signal for display.

Advantageously, the remote digital video memory and signaling of the present invention reduces the amount of memory in a video system. In particular, the remote digital video memory eliminates the need for a refresh memory inside the cameras for show shutter operation, while providing the necessary display refresh information. In this way, the cost of the video system is reduced. Another advantage is that the remote memory can be used for other image enhancement functions as well as RDSS function.

BRIEF DESCRIPTION OF THE DRAWINGS

The teachings of the present invention can be readily understood by considering the following detailed description in conjunction with the accompanying drawings, in which:

FIG. 5A depicts a simplified timing diagram of a portion of a color video signal of the prior art;

FIG. 5B depicts a simplified timing diagram of an enable-slow-shutter signal of the present invention superimposed on the color video signal of FIG. 5A;

To facilitate understanding, identical reference numerals have been used, where possible, to designate identical elements that are common to some of the figures.

DETAILED DESCRIPTION

After considering the following description, those skilled in the art will clearly realize that the teachings of the present invention can be utilized in substantially any video system having multiple video sources. The invention can be readily incorporated into a video matrix switch or a multiplexer, or integrated as a stand-alone component into a video system. Nevertheless, to simplify the following discussion and facilitate reader understanding, the present invention will be described in the context of use with a video matrix switch.

Generally, the invention is a digital video memory that is located remotely from one or more cameras that is used when a camera is operated in a slow shutter mode. Bidirectional signals between the digital video memory and the cameras inform the cameras of the presence of the digital video memory, and whether the contents of the digital video memory should be updated. In an alternate embodiment, a unidirectional signal informs the digital video memory whether to update its contents. The digital video memory can be used with both a conventional camera and a camera embodying the signaling of the present invention. The remote digital video memory eliminates the need for a refresh memory inside a camera. Therefore, the cost of the cameras and the video system is reduced.

Figure 1:
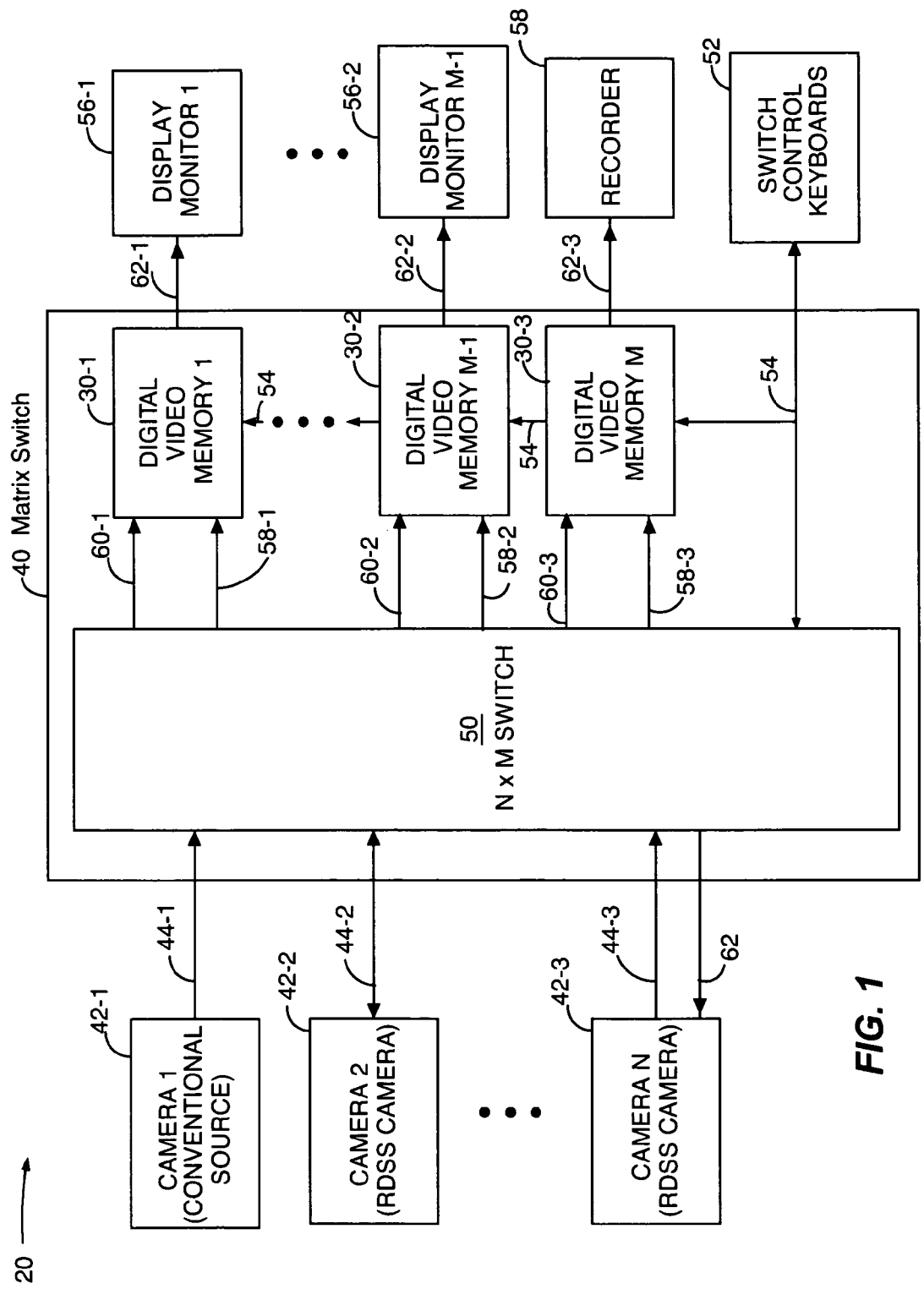
FIG. 1 is a block diagram of a video surveillance system using the remote digital slow shutter video processing in accordance with the present invention.

FIG. 1 depicts a high-level block diagram of a video system 20 embodying the digital video memories, 30-1, 30-2 and 30-3, and signaling of the present invention in a matrix switch 40. Multiple cameras, 42-1, 42-2 and 42-3, supply video signals on leads, 44-1, 44-2 and 44-3, respectively, to an N×M switch 50. The leads 44 are typically coaxial cable, such as RG59. One or more switch control keyboards 52 are connected to the N×M switch 50 and digital video memories 30 via lead 54 to allow a user to select and control the cameras 42, N×M switch 50, digital video memories 30, display monitors 56 and video recorder 58. The video recorder 58 records selected signals from the N×M switch 50.

Camera 1 (42-1) is a conventional video source, different from the video source of the present invention. Camera 1 could be a digital-slow-shutter camera with built-in memory, as will be described below with respect to FIG. 3. Camera 1 could also be a conventional camera or other video source that does not implement digital-slow-shutter video processing. Cameras 2 and 3, 42-2 and 42-3, respectively, are video sources that implement the remote digital slow shutter (RDSS) image processing of the present invention.

The N×M switch receives the video signals from the cameras on the N inputs from leads 44. The N×M switch 50 switches selected video signals to the output leads 60. Because the N×M switch 50 outputs images from selected cameras 42 to a respective digital video memory 30 to be displayed on a display monitor 56, the number of inputs (N) to the N×M switch 50 is typically greater than the number of outputs (M). The N×M switch also sends control signals on leads 58 to the digital video memory 30.

The digital video memory 30 of the present invention receives a selected video camera signal from the N×M switch 50 via a respective switch output lead 60, stores a digital representation of the video camera signal, and supplies a video output signal to its respective display monitor 56 or recorder 58 on leads 62. The digital video memory 30 provides the video output signal in a specified format on leads 62. The digital video memory 30 can accept many video formats including NTSC, PAL and Super VHS. In response to a user selection from the switch control keyboard, the digital video memory 30 can also output many video formats including: NTSC, PAL, Super-VHS, progressive scan RGB, field averaged, vibration stabilized video in any of the aforementioned formats, direct pass-through NTSC or PAL video, and motion highlight. The input and output formats of the digital video memory 30 can be selected to optimize picture quality. Because the output format does not need to be the same as the input format, the high resolution progressive scan format can be used. The user specifies the input and output video formats using the switch control keyboard 52.

The digital video memory 30 can be implemented with a dual-ported memory so that the image data representing the camera video signal, in frames or fields, may be received at a first speed, and output at a second speed. When a camera 42 is not operating in slow shutter mode, the first speed is typically equal to the second speed. When a camera 42-2, 42-3 of the present invention is operating in slow shutter mode, although the frames or fields may be received at the first speed, the don't-write signal prevents frames having invalid video information from being stored in the digital video memory 30.

The digital video memory 30 is also compatible with conventional cameras 42-1 that use a refresh memory to provide slow shutter operation because the conventional camera does not generate the don't-write signal. Therefore, the frames or fields from the conventional camera 42-1 are always stored in the digital video memory 30 prior to being displayed. In this way, the digital video memory 30 and signaling of the present invention are compatible with both conventional cameras 42-1 and the cameras 42-2, 42-3 embodying the present invention.

In one embodiment, the-signaling of the present invention is superimposed in the video signal during the vertical blanking interval. In particular, the bidirectional signaling is provided as a COAXITRON-like signal on lead 44-2 (COAXITRON is a Registered Trademark of Pelco Sales, Inc.). Therefore, no additional leads are required for the signaling.

In an alternate embodiment, separate leads 44-3, 62 transmit the video and bidirectional signals of the present invention, respectively. The coaxial cable, lead 44-3, transmits the video signal from the camera 42, and another signaling transmission medium, lead 62, transmits the associated bidirectional control signals. In one embodiment, the bidirectional control signals are transmitted concurrently with the vertical blanking interval for a field or frame. The signaling transmission medium includes any one of twisted pair, fiberoptic cable or radio signals. The signals on twisted pair can use an RS-232 (EIA 232D) interface.

Figure 2:
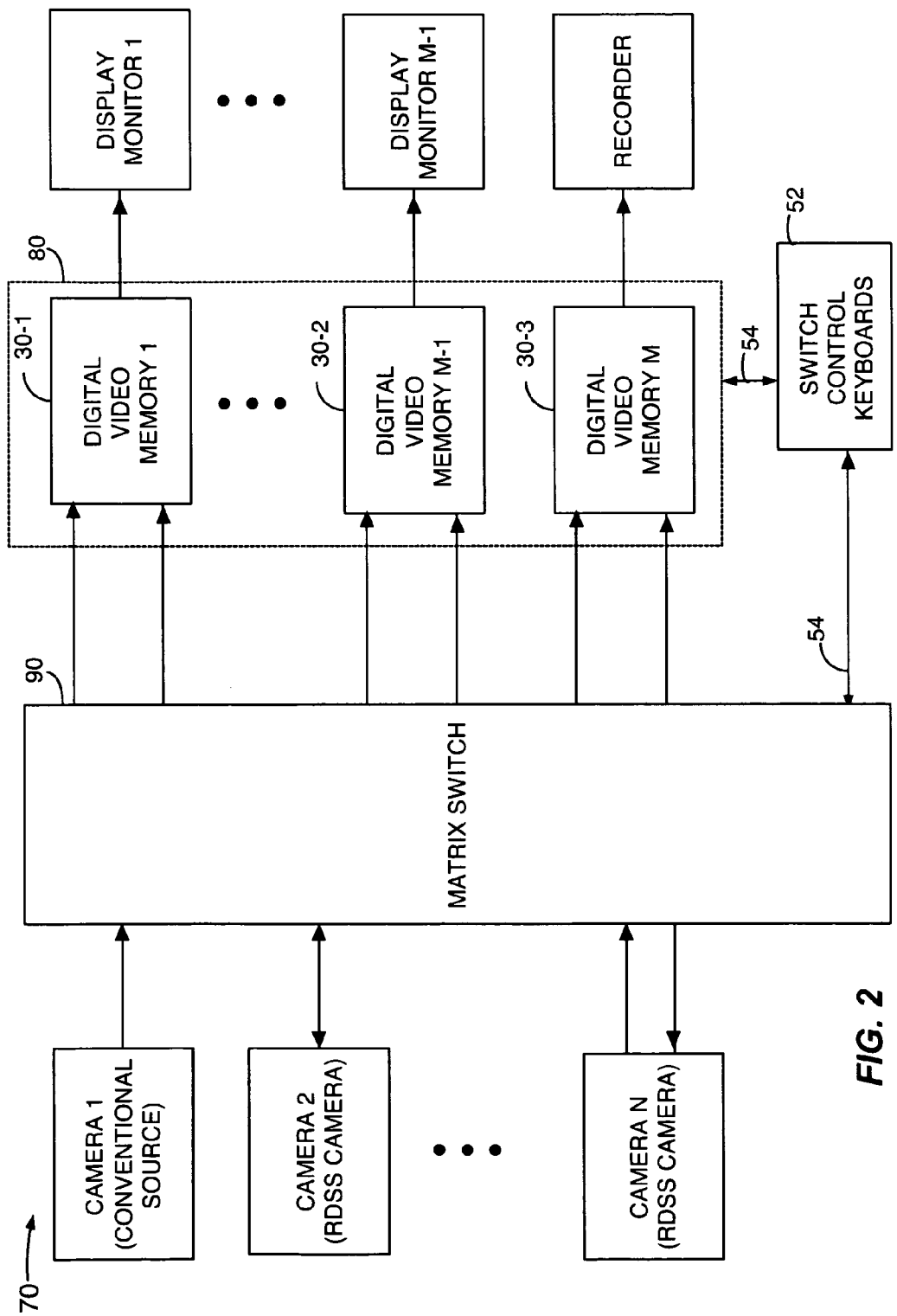
FIG. 2 is a block diagram of a video surveillance system using the remote digital slow shutter video processing in accordance with an alternate embodiment of the present invention.

FIG. 2 is a block diagram of a video surveillance system 70 using remote digital slow shutter video processing in accordance with an alternate embodiment of the present invention. FIG. 2 is the same as FIG. 1 except that one or more digital video memories are incorporated into a remote memory unit 80, separate from a matrix switch 90. For simplicity, control signal 54 from the switch control keyboard 52 to each digital video memory 30 are not shown. Using this configuration, the digital video memory 30 can be integrated into existing systems.

Referring back to FIG. 1, in another alternate embodiment, the digital video memory 30 and bidirectional signaling are incorporated into a multiplexer that selectively switches video signals from multiple cameras to the video recorder 58. The multiplexer includes a selector that supplies a selected video signal to the digital video memory 30-3. For example, in this embodiment, the selector replaces the N×M switch 50 of FIG. 1. The digital video memory 30-3 supplies the video signal to the video recorder 58. In another alternate embodiment, similar to FIG. 2, the digital video memory 30-3 is a separate component that is connected to the output of a conventional multiplexer and to the input of the video recorder 58. Referring to FIG. 2, in this embodiment, the multiplexer replaces the matrix switch 90 of FIG. 2.

Figure 3:
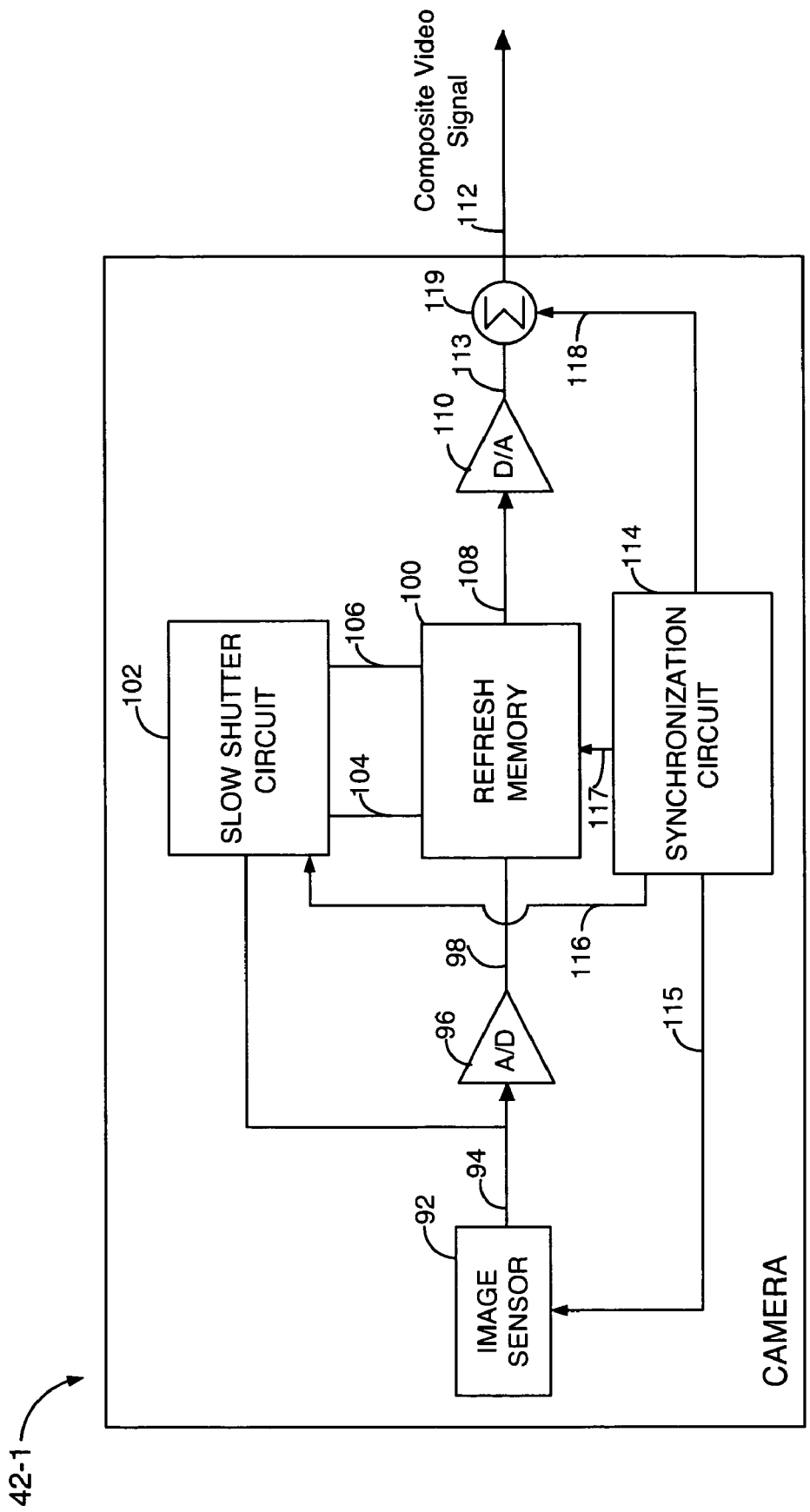
FIG. 3 is a block diagram of a conventional video camera suitable for use with the present invention.

Referring to FIG. 3, before describing the signaling and circuitry of the present invention, a conventional video camera 42-1 will be described. FIG. 3 is a general block diagram of a conventional video camera 42-1 suitable for use with the digital video memory of the present invention. An image sensor 92 receives an image and outputs analog pixel information representing the image on lead 94. An analog-to-digital (A/D) converter 96 converts the analog pixel information to digital image data that is supplied on lead 98 to a refresh memory 100. The refresh memory 100 stores digital image data representing one video field or frame, and provides image data of sufficient visual quality during slow shutter mode. Typically the refresh memory is a dual-port random access memory (RAM). A slow shutter circuit 102 monitors the signal from the image sensor 92 and generates write addresses on lead 104 at which to store the incoming image data, and read addresses on lead 106 from which to read the pixel data for output. Because the image data in the refresh memory 100 is not updated as frequently as 1/60th of a second in slow shutter mode, the existing image data in the refresh memory 100 is output on lead 108 every 1/60th of a second. A digital-to-analog converter 110 receives the digital image data on lead 108, and converts the digital image data to an analog video signal on lead 113. A synchronization circuit 114 provides different sets of synchronization information on leads 115, 116 and 117 to the image sensor 92, the slow shutter circuit 102, and the refresh memory 100, respectively. The synchronization information on lead 117 includes an identification of the current horizontal line being scanned. The synchronization circuit 114 supplies vertical and horizontal synch pulses on lead 118 to a summer 119. The summer 119 combines the vertical and horizontal synch pulses on lead 118 to the analog video signal on lead 113 to generate the composite video signal on lead 112. In one embodiment, lead 112 is a coaxial cable.

Figure 4:
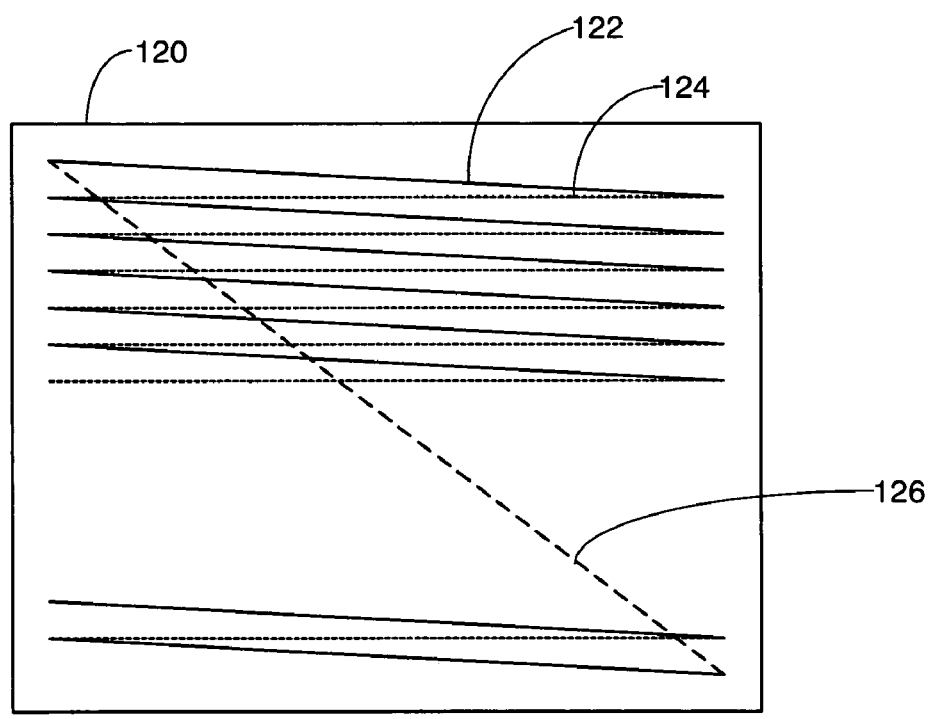
FIG. 4 is a diagram of a typical television scan pattern.

FIG. 4 illustrates the scan lines of the camera for a frame or field 120, depending on the video format. Solid lines 122 are the horizontal scan lines for rows of pixels, when the picture information is being acquired. Dashed lines 124 are the return lines when the camera is returning to the start of another horizontal scan line, and no video image is acquired or displayed during this time. Dashed line 126 represents the vertical blanking interval when the scanning resumes at the start of the next frame or field. The vertical blanking interval is approximately 1.3 milliseconds. No image is acquired or displayed during the vertical blanking interval.

Figure 5C:
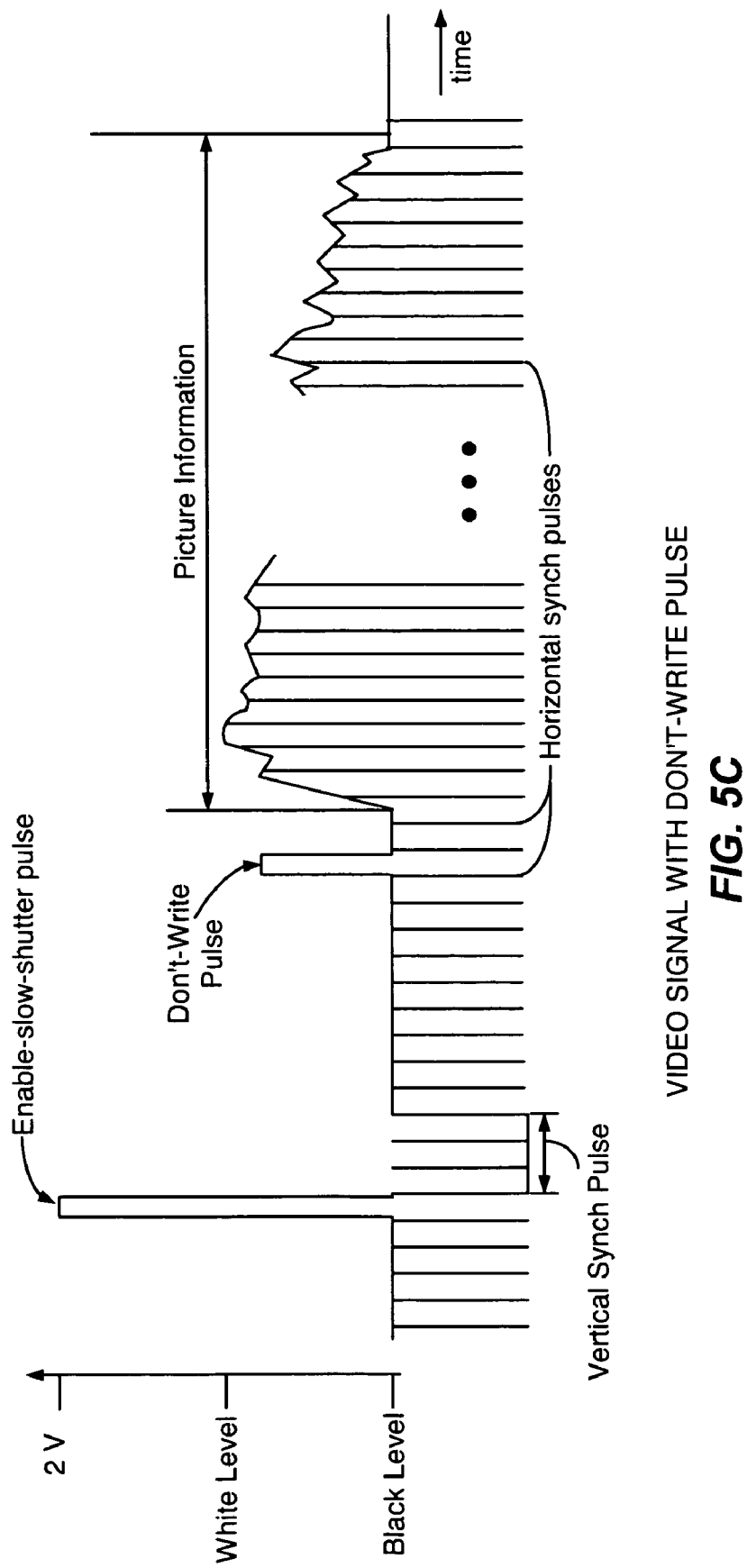
FIG. 5C depicts a simplified timing diagram of a don't-write-signal of the present invention superimposed on the color video signal of FIG. 5B.

Referring now to FIGS. 5A, 5B and 5C, the bidirectional signaling of the present invention will now be described. The bidirectional signals include a first signal from the remote digital video memory to the camera, and a second signal from the camera to the remote digital video memory. The first signal, the enable-slow-shutter signal, informs the camera of the presence of the remote digital video memory. The second signal, the don't-write signal, informs the remote digital video memory that a selected camera is operating in slow shutter mode and that a video field or frame associated with the don't-write signal should not be stored in the remote digital video memory. In this way, the camera transmits all necessary synch signals every $\frac{1}{60}$th of a second to maintain synchronization, without storing invalid image data. In addition, using the don't-write signal, slow shutter operation is efficiently and effectively provided via the remote digital video memory because inappropriate image data is not stored and the displayed image has sufficient visual quality.

FIG. 5A illustrates a conventional analog composite color video signal for a single field that is output by the conventional camera of FIG. 3. For simplicity, the term, field, will be used to refer to both a frame and a field. The video signal repeats for each field. The field has a vertical blanking interval that corresponds to the vertical blanking interval of FIG. 4. The vertical blanking interval of FIG. 5A is expanded for illustrative purposes. The y-axis depicts the voltage of the color video waveform. During the vertical blanking interval, the camera outputs a black level voltage (approximately 0 volts). A white level voltage that is one volt above the black level voltage is also shown on the y-axis. In the vertical blanking interval, a vertical synch pulse defines the start of a new field. The vertical synch pulse is a negative pulse with respect to the black level voltage, and has a predetermined vertical synch pulse width of approximately 190 microseconds. The black level portion of the signal prior to the vertical synch pulse is referred to as the front porch, and the black level portion of the signal following the vertical synch pulse is referred to as the back porch. The duration of the vertical blanking interval corresponds to about twenty-two horizontal scan lines.

The field also has a picture or image information portion that corresponds to the pixels of the horizontal scan lines. Horizontal synch pulses, that correspond to the horizontal return lines of FIG. 4, indicate the start of a horizontal scan line, and are provided during the vertical blanking interval to maintain synchronization.

For color images, a color burst signal in the horizontal blanking interval provides a reference for determining the color of each pixel in the field. For simplicity, the color burst field is not shown.

FIG. 5B depicts a simplified timing diagram of the enable-slow-shutter signal superimposed on the video signal of FIG. 5A and produced by the digital video memory of FIGS. 1 and 2. In one embodiment, a lock pulse is a large amplitude positive pulse in the front porch of the vertical blanking interval. The matrix switch provides the lock pulse to synchronize video system components by synchronizing the timing of the vertical synch pulses. The lock pulse has an amplitude of approximately two volts and pulse width of approximately five microseconds. As shown in FIG. 5B, the enable-slow-shutter signal extends the duration of the lock pulse, and has a predetermined enable-slow-shutter pulse width that is greater than the lock pulse width. In one embodiment, the enable-slow-shutter pulse width ranges from about ten to about fifteen microseconds, and the standardized lock pulse width ranges from about two to five microseconds. The amplitude of the lock pulse and the enable-slow-shutter signal is greater than the white level voltage (approximately 1 volt) from the camera so as to distinguish the non-camera source of the lock pulse and enable-slow-shutter signal.

FIG. 5C depicts a simplified timing diagram of the don't-write signal superimposed on the video signal of FIG. 5B and produced by the camera of the present invention of FIGS. 1 and 2. In one embodiment, the don't-write signal is a large amplitude positive pulse in the back porch of the vertical blanking interval. The amplitude of the don't-write signal is approximately 0.75 volt above to the black level voltage (approximately 0 volts), has a don't-write pulse width of approximately 50 microseconds.

In an alternate embodiment, different amplitudes, locations and shapes of the don't-write signal are possible. In an alternate embodiment, the amplitude of the don't-write signal is approximately equal to 1 volt above the black level voltage. In another alternate embodiment, the don't-write signal is implemented by applying a positive pulse in the back porch of the vertical interval that has a pulse width exceeding a predetermined threshold. In yet another alternate embodiment, the don't-write signal is applied in the front porch of the vertical blanking interval. In an alternate embodiment, the don't-write pulse comprises multiple, at least two, pulses.

Although FIG. 5C, shows that the picture information changes, in a typical embodiment, the picture information of the field having the don't-write pulse is black.

By providing the don't-write signal of the present invention, rather than a write signal, the digital video memory of the present invention is compatible with both conventional cameras and cameras of the present invention. A conventional camera will not provide the don't-write signal. For conventional cameras, the CCD image sensor stores the video information, and the camera is not modified. In addition, a conventional camera will not detect and respond to the enable-slow-shutter signal.

In an alternate embodiment, the don't-write signal can be used to block the slow shutter camera from being displayed on conventional display channels when it is in slow-shutter mode because the picture is not easily viewable without the special memory. In a typical twenty to one integration mode, there would be nineteen fields marked don't-write, followed by one unmarked field, which signifies "write this one."

Figure 6:
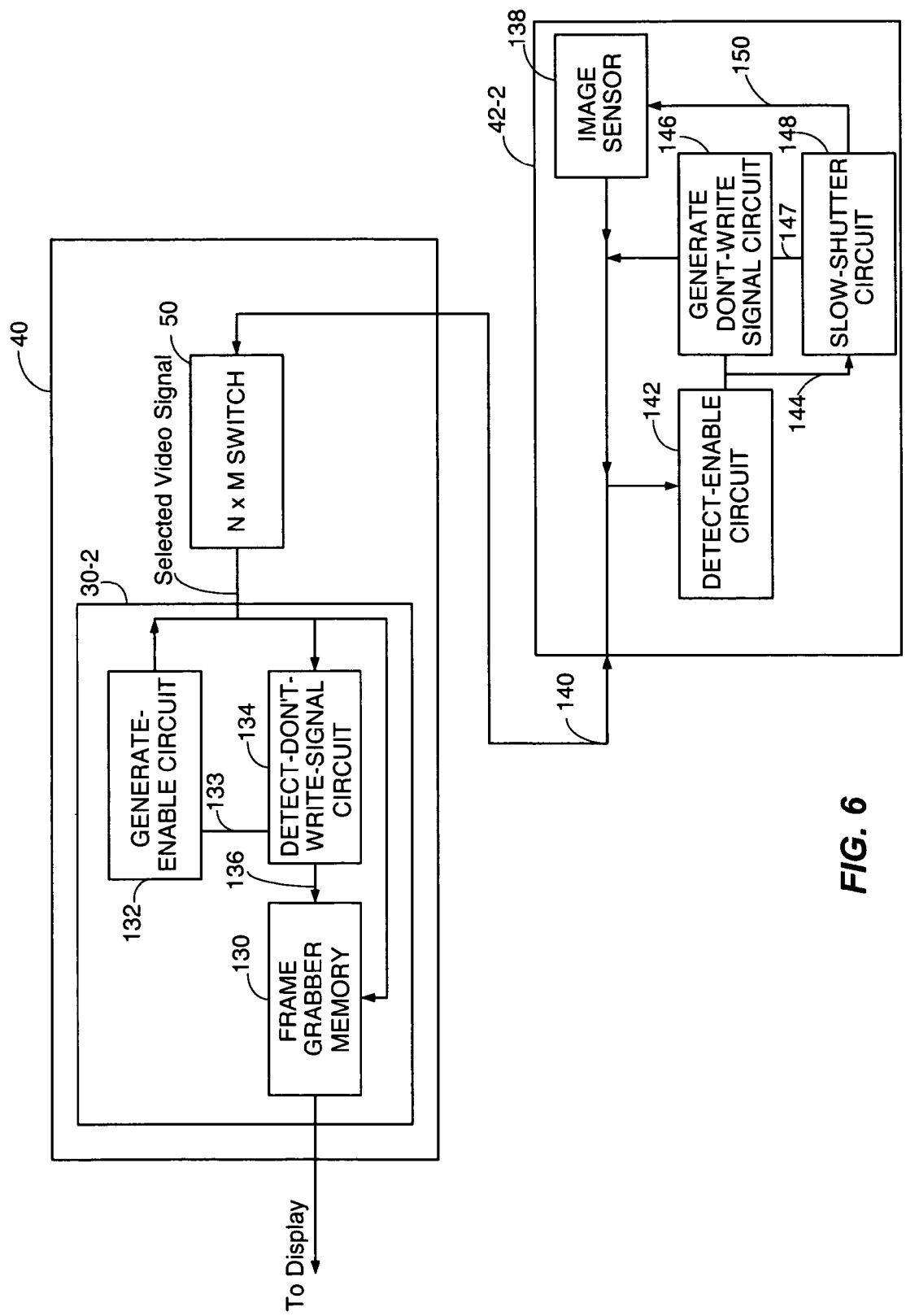
FIG. 6 is a general block diagram of the major circuits implementing the bidirectional signaling of FIGS. 5B and 5C in a video system.

FIG. 6 is a block diagram of a camera 42-2 and matrix switch 40 including the digital video memory 30-2 of FIG. 1. In the matrix switch 40, an N×M switch 50 is coupled to the digital video memory 30-2, described above with respect to FIG. 1. For simplicity, a single digital video memory 30-2 is shown. The digital video memory 30-2 includes a frame grabber memory 130 which stores digitized image information for a frame of the video signal. A generate-enable circuit 132 generates the enable-slow-shutter signal for transmission to the camera 42-2, as shown in FIG. 5B. The generate-enable circuit 132 also provides a logic signal on lead 133 that indicates that the enable-slow-shutter signal is being generated to the detect-don't-write signal circuit 134. In response to the don't-write pulse of FIG. 5C, a detect-don't-write signal circuit 134 outputs a don't-write logic signal on lead 136, which is used to prevent the frame grabber memory 130 from storing the subsequent pixel information for the frame in the frame grabber memory 130.

The camera 42-2 includes the image sensor 138, described above, which supplies a video signal on lead 140. A detect-enable-signal circuit 142 detects the enable-slow-shutter signal and outputs an enable logic signal on lead 144. In response to the enable logic signal, a generate-don't-write-signal circuit 146 generates the don't-write signal of FIG. 5C when the image sensor 138 has not completed acquiring a frame during slow shutter mode. Synchronization signals on lead 147 from a slow-shutter circuit 148 synchronize the operation of the generate-don't-write circuit with the timing of the video signal output by the image sensor 138. The slow-shutter circuit 148 is responsive to the enable logic signal on lead 144 to apply control signals to leads 150 to operate the image sensor 138 in a slow shutter mode.

Figure 7:
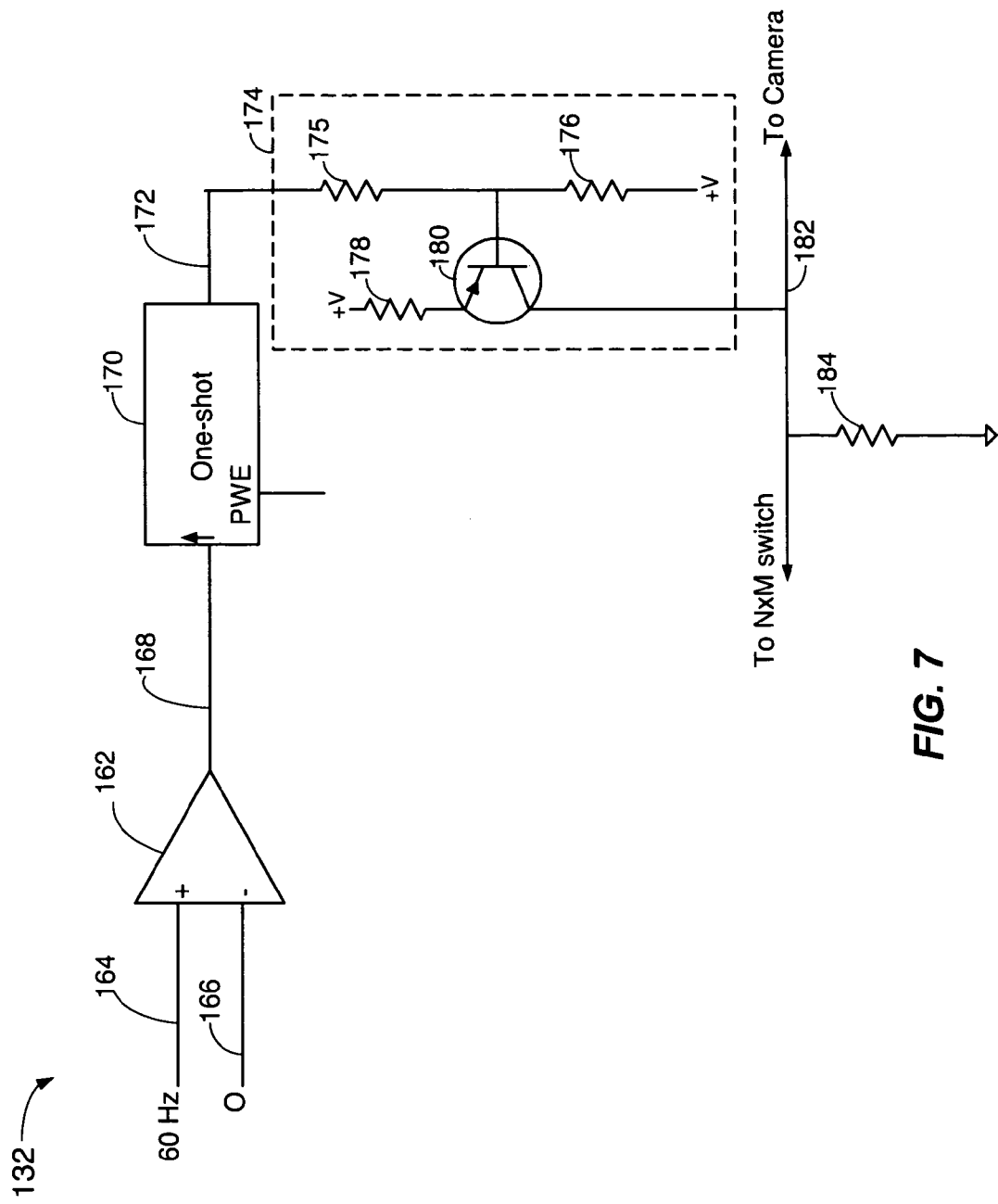
FIG. 7 is a circuit diagram of a generate-enable signal circuit of FIG. 6 that generates the enable-slow-shutter signal of FIG. 5B.

FIG. 7 is a circuit diagram of an embodiment of the generate-enable circuit 132 of FIG. 6 that generates the enable-slow-shutter signal of FIG. 5B by extending the duration of the lock pulse. The lock pulse is synchronized to the zero-crossings of the 60 Hz frequency of the power line. A comparator 162 receives the 60 Hz power supply voltage on lead 164 and a ground on lead 166 and outputs a zero-crossing signal on lead 168 when the 60 Hz power line signal is equal to zero. A one-shot 170 receives the zero-crossing signal on lead 168 and outputs a negative pulse having a specified pulse width. A pulse-width-enable (PWE) input to the one-shot specifies the width of the pulse output by the one-shot 170. When the pulse-width-enable input receives a signal having a first state, the width of the output pulse on lead 172 is approximately five microseconds. When the pulse-width-enable input receives a signal having a second state, the width of the output pulse on lead 172 is approximately fifteen microseconds. The output pulse on lead 172 is supplied to an enable signal drive circuit 174. In the enable signal drive circuit 174, the values of resistors 175, 176 and 178 are selected such that transistor 180 is normally active when the one-shot 170 outputs a zero volt signal, and applies a voltage of approximately two volts to the composite video signal on lead 182. When the output of the one-shot 170 transitions high, transistor 180 becomes inactive and the two volts is no longer applied to lead 182, causing the voltage of the composite video signal on lead 182 to drop by approximately two volts, until the output of the one-shot 170 transitions low. Another resistor 184 is coupled between lead 182 and ground to control the impedance of lead 182. In this way, a stream of lock pulses having an extended pulse width is generated.

In an alternate embodiment, the invention is applied to a lock signal that is synchronized to a 50 Hz power line.

Figure 8:
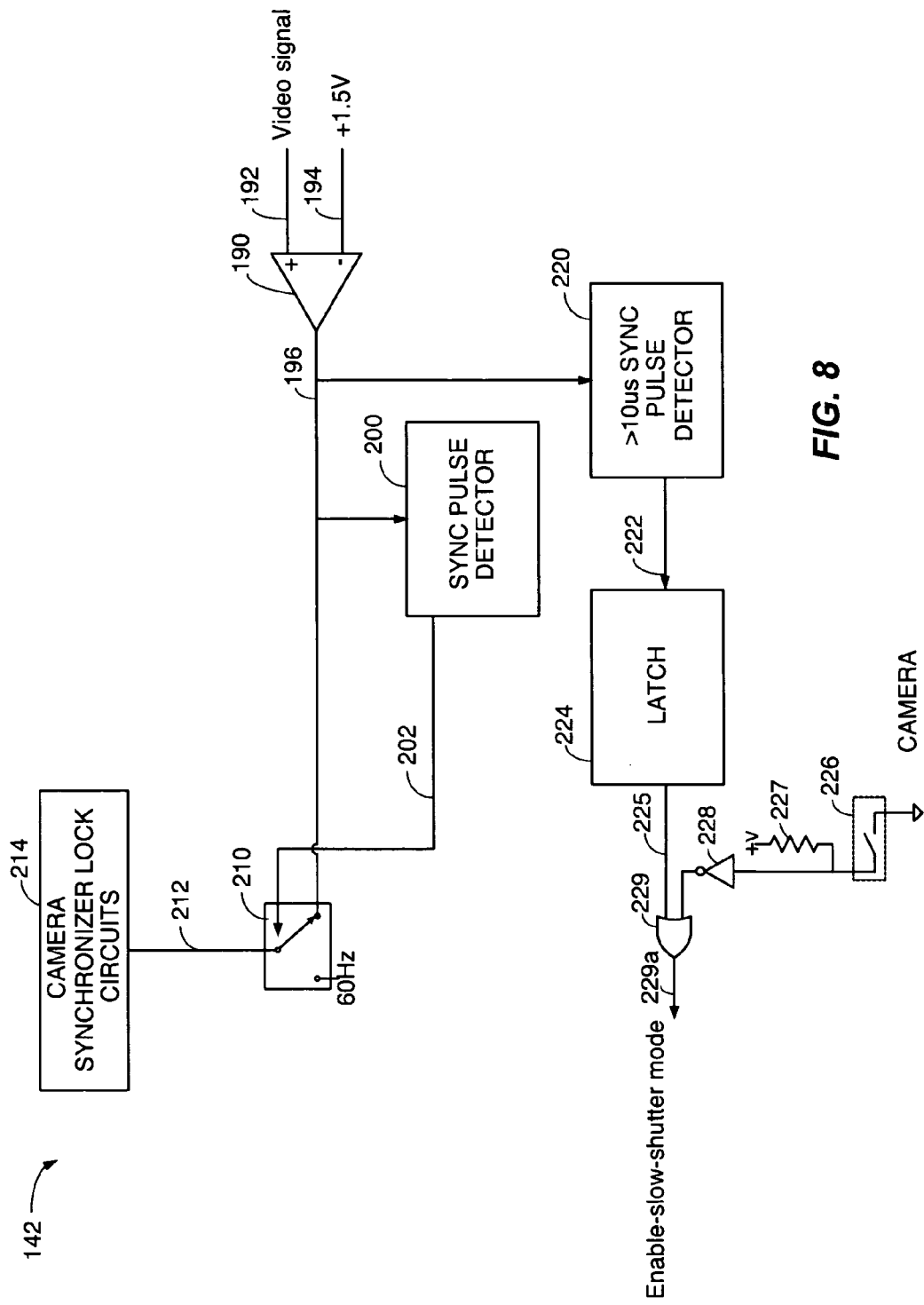
FIG. 8 is a circuit diagram of a detect-enable signal circuit of the camera of FIG. 6 that detects the enable-slow-shutter signal of FIG. 5B.

FIG. 8 is a block diagram of the detect-enable-signal circuit 142 of FIG. 6 that detects the enable-slow-shutter signal of FIG. 5B. In one embodiment, the external lock signal is supplied to the camera to synchronize the phase of the vertical synch pulses in the cameras and other components of the video system. The external lock signal is generated by superimposing a large pulse, greater than the white level voltage, on the video signal in the vertical blanking interval. The pulse width of the external lock signal is extended to prove the enable-slow-shutter signal. Another function of the circuitry of FIG. 8 is to provide a continuous pulse train of lock pulses so that all cameras and components of the video system are locked to the same vertical synch signal to reduce synchronization problems. A comparator 190 receives the video signal on lead 192 and a +1.5 volt signal on lead 194. The comparator 190 outputs a logical one signal on line 196 when the lock pulse is present. Typically, the pulse width of the lock pulse is approximately equal to five microseconds. The synch pulse detector 200 is a well-known circuit that detects the presence of the lock pulses and outputs a logical one on lead 202, if a lock pulses are being received at regular intervals, such as 1/60th of a second. The signal on lead 202 controls a switch 210 that provides the lock pulses to lead 212 when the lock pulses are received at regular intervals. When the lock pulses are not received at regular intervals, the switch 210 provides lock pulses that are derived from and locked to the positive transition of the AC power signal at the zero-crossings of the AC power signal. The vertical trigger pulses on lead 212 are supplied to camera synchronizer lock circuits.

In addition to the traditional synch pulse detector 200, a >10 microsecond (us) synch pulse detector circuit 220 determines whether the width of a lock pulse is greater than a predetermined threshold, approximately ten microseconds in one embodiment. The >10 us synch pulse detector circuit 220 outputs an enable-detected signal on lead 222. The enable-detected signal is equal to a logical one when a lock pulse having a pulse width greater than 10 microseconds, that is, the enable-slow-shutter signal, is detected, and is equal to zero otherwise. A latch 224 is initially set to a first state at power on that indicates that the enable slow shutter signal has not been detected. In one embodiment, in the first state, the latch 224 outputs a logical zero as a disable-slow-shutter mode signal on lead 225. The latch is set to a second state when the >10 us synch pulse detector circuit outputs the enable-detected signal. In one embodiment, the enable-slow-shutter signal is provided directly by the latch on lead 225. In another embodiment, in the second state, the latch 224 outputs a logical one as the enable-slow-shutter mode signal on lead 225. In an alternate embodiment, the latch 224 is reset to the first state at each vertical synch pulse, and is set to the second state by the enable-detected signal.

In another embodiment, shown in FIG. 8, a switch 226 is manually operated to enable the remote digital slow shutter processing of the present invention. In one embodiment, the switch 226 is attached to the camera. When remote digital slow shutter processing is not enabled, the switch 226 is open and pull-up resistor 227 applies a logical one to inverter 228. Inverter 228 supplies a logical zero to OR gate 229, and the enable-slow-shutter signal is determined by the state of the latch 224. When remote digital slow shutter processing is enabled, the switch 226 is closed and a logical zero (ground) is applied to the input of inverter 228. Inverter 228 supplies a logical one to OR gate 229 which forces the enable-slow-shutter signal to a logical one, thereby enabling remote digital slow shutter image processing for the camera.

Figure 9:
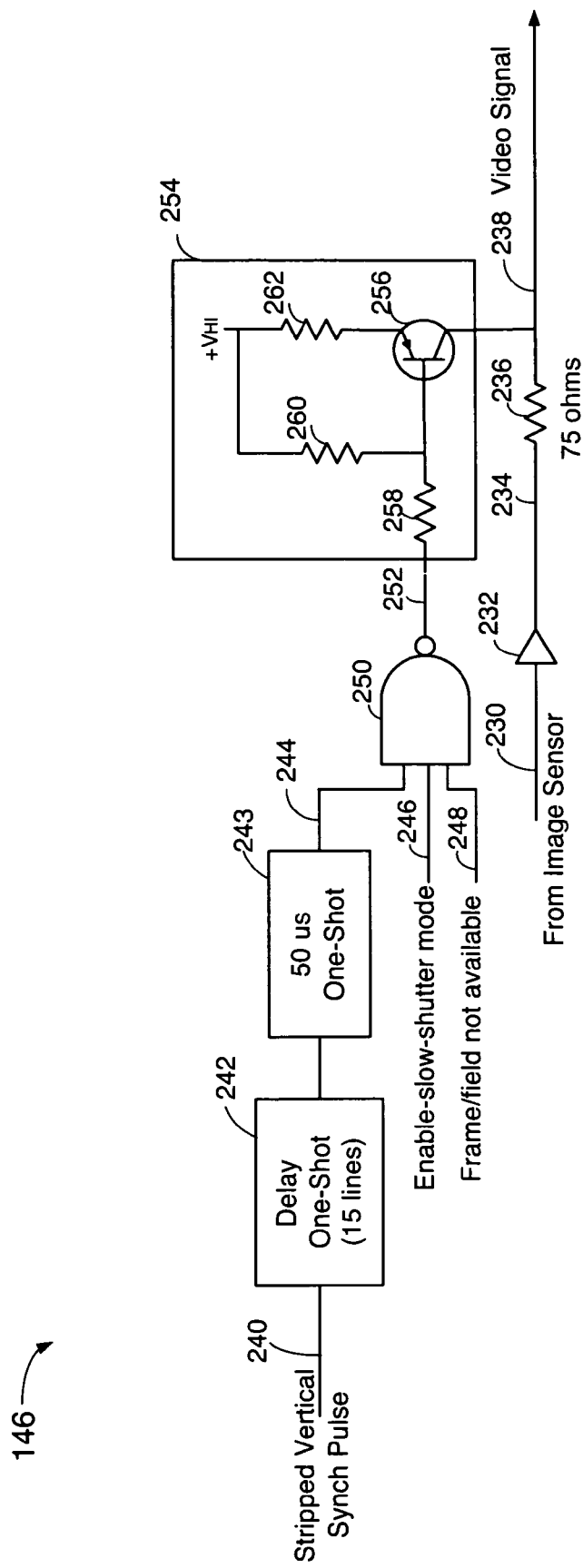
FIG. 9 is a circuit diagram of a generate-don't-write-signal circuit of the camera of FIG. 6 that generates the don't-write signal of FIG. 5C.

FIG. 9 is a circuit diagram of the generate-don't-write-signal circuit 146 of FIG. 6 that generates the don't-write signal of FIG. 5C. The video signal from the image sensor is applied to lead 230 and amplified by driver amplifier 232, output on lead 234 for transmission via resistor 236 over a coaxial cable 238. A pulse generator generates stripped vertical synch pulses that are logic signals synchronized to the timing of the vertical synch pulses of the composite video signal output by the camera. The stripped vertical synch pulses are applied to lead 240 and input to the delay one-shot 242 which provides a delay of approximately fifteen horizontal lines. At the trailing edge of the pulse from the delay one-shot 242, the one-shot 243 outputs a fifty microsecond positive pulse on lead 244. A frame/field not available signal is asserted when the image sensor has not completed acquisition of an image. When the enable-slow-shutter mode signal is asserted on lead 246 and the frame/ field not available signal is asserted on lead 248, the NAND gate 250 outputs a negative pulse on lead 252, the complement of the pulse output by one-shot 243. The signal on lead 252 is supplied to a don't-write-pulse driver circuit 254. When the signal on lead 252 is high, transistor 256 is inactive and the video signal on lead 238 is unchanged. When the signal on lead 252 is low, transistor 256 becomes active and applies a high voltage level (+VHI) to the video signal on lead 238. The values of resistors 258, 260 and 262 are selected such that transistor 256 will provide a specified amount of drive current. In one embodiment, the don't-write voltage level is at least approximately 0.75 volts, and is applied for at least fifty microseconds. The high voltage level is applied to the video signal as long as the signal from the one-shot 243 is high. In this way, the generate-don't-write circuit 146 generates the don't-write signal.

Figure 10:
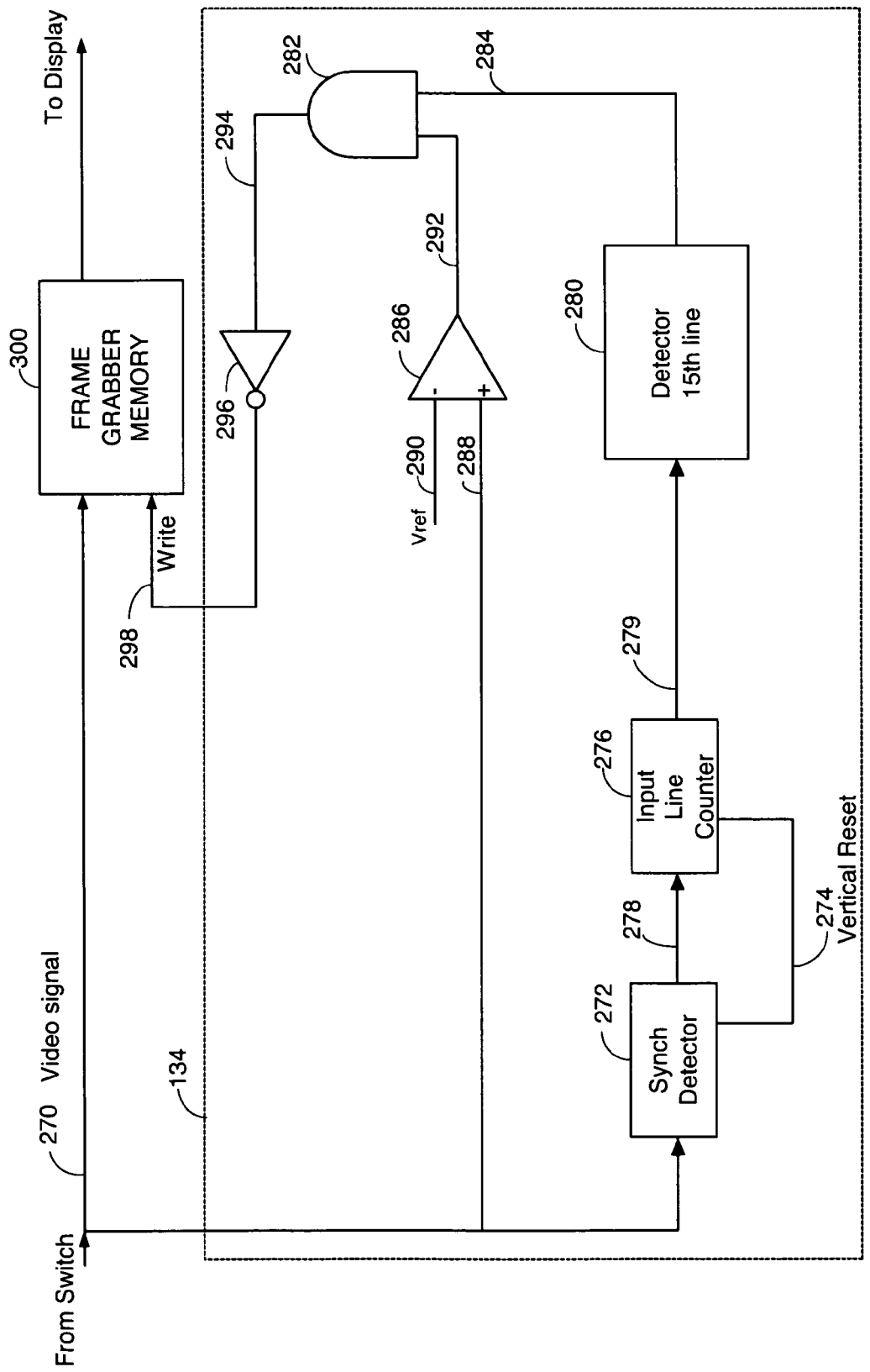
FIG. 10 is a circuit diagram of a detect-don't-write-signal circuit of the digital video memory of FIG. 6 that detects the don't-write signal of FIG. 5C.

FIG. 10 is a circuit diagram of the detect-don't-write-signal circuit 134 of FIG. 6 that detects the don't-write signal of FIG. 5C. The composite video signal is received on lead 270. A synch pulse detector 272 detects vertical synch pulses and outputs the vertical synch pulses on lead 274 to an input counter 276. The synch pulse detector 272 also supplies horizontal synch pulses on lead 278 to the input line counter 276 to count the number of horizontal lines. The input address counter 276 outputs a signal representing a count of the number of horizontal lines on lead 279 to a $15^{th}$-line detector 280. When the count is equal to fifteen, the $15^{th}$-line detector 280 applies a digital one to an input of an AND gate 262 on lead 284.

A comparator 286 compares the video signal on lead 288 to a reference voltage (VREF) on lead 290. In one embodiment, the reference voltage is equal to +0.6 volt. When the video signal is greater than or equal to the reference voltage, a don't write pulse may have been received, and the comparator 286 outputs a digital one on lead 292; otherwise, the comparator 286 outputs a digital zero. When a digital one is applied to both leads 284 and 292, a don't-write pulse has been detected in the vertical blanking interval, and the AND gate 282 outputs a digital one on lead 294. The inverter 296 receives the digital one on lead 294 and outputs a digital zero on lead 298 to the write control signal of a frame grabber memory 300. The digital zero on lead 298 of the write control signal disables the frame grabber memory 300 from being updated; otherwise, the frame grabber memory 300 can be updated with new video information.

Figure 11:
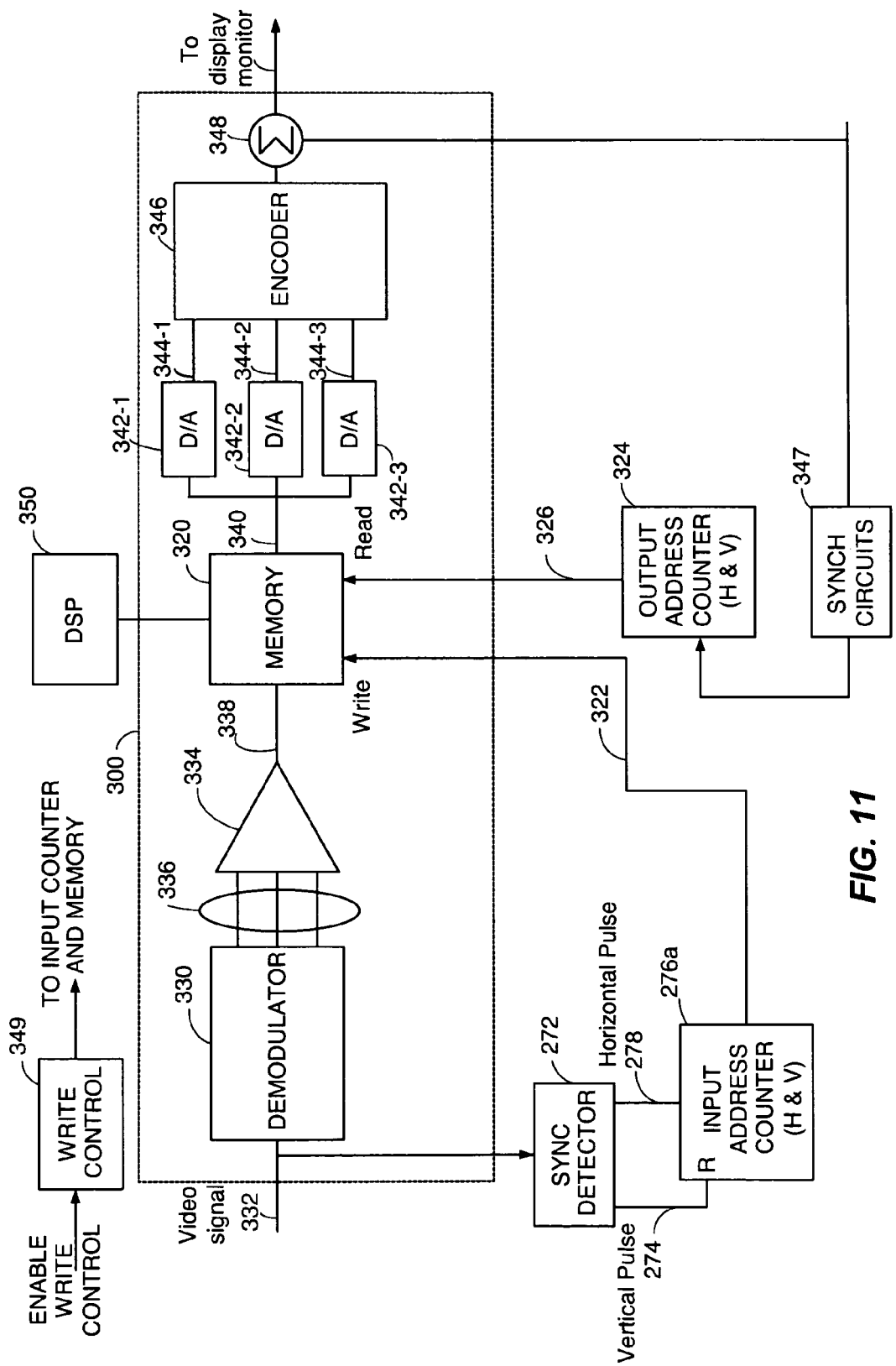
FIG. 11 is a block diagram of a frame-grabber memory of FIG. 10 in accordance with an embodiment of the present invention.

FIG. 11 is a block diagram of the frame-grabber memory 300 of FIG. 10 in further detail. Components already described above with respect to FIG. 10 will not be described again. To store a digital representation of the video signal in the memory, the input address counter 276a supplies write addresses on leads 322 to the memory 320 based on the vertical and horizontal synch pulses. In one implementation, the memory 320 is a dual-ported RAM. An output address counter 324 supplies read addresses on leads 326 to the memory 320 to output the image data to a display monitor.

In the frame grabber memory 300, a demodulator 330 demodulates the composite video signal on lead 332 to supply a luminance and two chrominance signals to an analog-to-digital converter 334 on leads 336. The analog-to-digital converter 334 outputs a digital representation of the luminance and chrominance signals on lead 338 to be stored the memory 320 at the generated write addresses. The output address counter 324 generates addresses from which pixel information will be read based on the horizontal and vertical synch pulses from the synch circuits 347. The memory 320 supplies the digital luminance and two chrominance values for the pixels, on lead 340 to a set of digital-to-analog converters 342-1, 342-2 and 342-3, that outputs analog pixel signals on leads 344-1, 344-2 and 344-3, respectively, that represent the luminance and two chrominance values. An encoder 346 encodes the analog pixel information on leads 344-1, 344-2 and 344-3, into a specified format. Synch circuits 347 provide horizontal and vertical pixel timing information to the output address counter 324. The synch circuit 347 also provides vertical and horizontal synch pulses to the summer 348. The summer 348 combines the encoded analog pixel information from the encoder with the vertical and horizontal synch pulses from the synch circuits 347 to provide a video signal having a specified format for output to a display monitor.

A write control circuit 349, in response to an enable write control signal, supplies write control signals to the components of FIG. 11, including the memory and input address counter.

To apply digital signal processing techniques to the digital image data in the memory 320, a digital signal processor (DSP) 350 accesses the image data in the memory 300, updates that image data, and stores the updated image data back in the memory 320. In one embodiment, in response to a user command from the switch control keyboard, the DSP 350 averages a predetermined number of frames to improve the signal to noise ratio of the video signal from a camera. For example, the most recent three frames may be continuously averaged, and that average is output. In an alternate embodiment, the DSP 350 is an adder. In another embodiment, the DSP 350 processes the image data in the memory 300 to reduce the amount of flicker in the displayed image.

In yet another embodiment, the capacity of the digital video memory is increased to provide an image history track to show the path of recent motion in the picture. Alternately, the digital video memory displays the differences in the picture to show what has moved or what is moving. To do so, the edges of moving objects in the selected video source would be highlighted.

Although the invention was described with respect to bidirectional signaling, in an alternate embodiment, unidirectional signaling is used. In this embodiment, the camera is manually enabled to perform remote digital slow shutter signaling when the remote memory is present, and only the don't-write signal is used, and the digital video memory does not provide the enable-slow-shutter signal. When a camera of the present invention is operating in slow shutter mode, the camera sends the don't-write signal to the digital video memory that responds as described above.

In another alternate embodiment, a camera is connected to the remote digital slow shutter memory of the present invention without an intervening switch or multiplexor.

Although various embodiments, each of which incorporates the teachings of the present invention, have been shown and described in detail herein, those skilled in the art can readily devise many other embodiments that still utilize these teachings.

I claim:

1. A closed circuit video system that utilizes shared video memory, said system having:
   a plurality, N, of image capture devices each producing a corresponding video signal so as to define a plurality of N video signals;
   a circuit, responsive to said plurality of video signals, which in response to a selection control signal, routes a specific group, M, of selected ones of said video signals produced by M respective ones of the N image capture devices to associated output devices, where M and N are positive integers; and wherein said circuit comprises:

a separate memory for each one of said M video signals, said separate memory implements a multi-functional shared store for its associated one of the M image capture devices, through which said separate memory supports video processing functionality associated with standard shutter imaging and slow shutter imaging as well as video processing functionality for other operations provided through said circuit such that said separate memory eliminates a need to have a separate frame store situated within or proximate to said associated one image capture device to implement slow shutter imaging, wherein, during standard shutter imaging and slow shutter imaging, the separate memory is updated at a field rate appropriate to said associated one image capture device and read out at a rate appropriate to an image store function; and said separate memory communicatively interacts with said associated one image capture device through which said associated one image capture device specifies, in response to whether said associated one image capture device is functioning in said standard or slow shutter imaging, if the separate memory should then update its video contents or not in response to a corresponding one of the video signals then being produced by said associated one image capture device.

2. The system recited in claim 1 wherein the circuit comprises a frame grabber, an N×M video recording multiplexer, an N×M video matrix switch or an N×M video selector.

3. The system recited in claim 2 wherein said associated one image capture device comprises a video camera or any other device that produces a video source signal.

4. The system recited in claim 2 wherein said communicative interaction between said associated one image capture device and said separate memory occurs through bi-directional signaling there between.

5. The system recited in claim 4 wherein said separate memory comprises a dual-ported memory.

6. The system recited in claim 4 wherein said output devices comprise a plurality of video monitors.

7. The system recited in claim 6 wherein said output devices include at least one video recorder.

8. The system recited in claim 4 wherein the circuit synchronizes capture and refresh display of images from said one video signal produced by said associated one of the image capture devices when said associated one image capture device is operating in a slow shutter image processing mode.

9. The system recited in claim 4 wherein the bidirectional signaling comprises a write control signal produced by said associated one image capture device, wherein the write control signal is a don't write signal.

10. The system recited in claim 9 wherein said associated one image capture device comprises a video camera or any other device that produces a video source signal.

11. The system recited in claim 9 wherein said separate memory comprises a dual-ported memory.

12. The system recited in claim 9 wherein said output devices comprise a plurality of video monitors.

13. The system recited in claim 12 wherein said output devices further comprise at least one video recorder.

14. The system recited in claim 9 wherein the bidirectional signaling further comprises an enable-slow-shutter signal to enable operation of a slow-shutter mode of an image sensor associated with said associated one image capture device, and the write control signal is a don't-write signal when slow-shutter imaging is enabled in said associated one image capture device and the image sensor has not accumulated an image for a predefined slow-shutter speed.

15. The system recited in claim 14 wherein the circuit further comprises:

an enable-detector circuit to detect the enable-slow-shutter signal; and a generate-don't-write-signal circuit to generate the don't-write signal.

16. The system recited in claim 15 wherein the circuit further comprises:

a generate-enable signal circuit to generate the enable-slow-shutter signal; and a detect-don't-write-signal circuit to detect the don't-write signal, wherein the separate memory maintains a stored image frame in the separate memory when the detect-don't-write-signal circuit detects the don't-write signal.

17. The system recited in claim 9 wherein the write control signal is separate from said one video signal.

18. The system recited in claim 9 wherein the write control signal is superimposed on said one video signal.

19. The system recited in claim 9 wherein a control signal within said bidirectional signaling is implemented through a unique voltage level superimposed on said one video signal.

20. The system recited in claim 9 wherein a control signal within said bidirectional signaling is a pulse occurring during a vertical blanking interval of said one video signal.

21. The system recited in claim 20 wherein said pulse has one or more predefined pulse widths that specify respective operating modes of said one image capture device.

22. A closed circuit video system that utilizes a shared image store, said system having:

a plurality, N, of image capture devices, each producing a corresponding video signal so as to define a plurality of N video signals;

a circuit, responsive to said plurality of video signals, which in response to a selection control signal, routes a specific group, M, of selected ones of said video signals produced by M respective ones of the N image capture devices to associated output devices, where M and N are positive integers; and wherein said circuit comprises:

a shared image store operative in conjunction with an associated one of said M video signals produced by a corresponding one of the N image capture devices, said image store implementing a multi-functional shared store for said associated one video signal, through which said image store provides video storage functionality to support both a predefined image store operation and a predefined image processing operation by selectively operating in a first or second mode, respectively, such that said shared image store eliminates a need to have a separate frame store memory situated within or proximate to said corresponding one image capture device, said image store operation being different from said image processing operation; and said image store communicatively interacts with said corresponding one image capture device through which said corresponding one image capture device instructs said shared image store to operate in said first or second mode so as to provide video storage functionality appropriate to either said image storage operation or said image processing operation as then required by current operation of said corresponding one image capture device.

23. The system recited in claim 22 wherein the circuit comprises a frame grabber, an N×M video recording multiplexer, an N×M video matrix switch or an N×M video selector.

24. The system recited in claim 23 wherein said associated one image capture device comprises a video camera or any other device that produces a video source signal.

25. The system recited in claim 23 wherein said communicative interaction between said associated one image capture device and said separate memory occurs through bi-directional signaling there between, and said first and second modes being write and don't write, respectively.

26. The system recited in claim 25 wherein said output devices comprise a plurality of video monitors.

27. The system recited in claim 26 wherein said output devices further comprise at least one video recorder.

28. The system recited in claim 25 wherein the circuit synchronizes capture and refresh display of images from said one video signal produced by said associated one of the image capture devices when said associated one image capture device is operating in a slow shutter image processing mode.

29. The system recited in claim 25 wherein the bidirectional signaling comprises a write control signal produced by said associated one image capture device, wherein the write control signal is a don't write signal.

30. The system recited in claim 29 wherein the bidirectional signaling further comprises an enable-slow-shutter signal to enable operation of a slow-shutter mode of an image sensor associated with said associated one image capture device, and the write control signal is a don't-write signal when slow-shutter imaging is enabled in said associated one image capture device and the image sensor has not accumulated an image for a predefined slow-shutter speed.

31. The system recited in claim 30 wherein the circuit further comprises:
  an enable-detector circuit to detect the enable-slow-shutter signal; and
  a generate-don't-write-signal circuit to generate the don't-write signal.

32. The system recited in claim 31 wherein the circuit further comprises:
  a generate-enable signal circuit to generate the enable-slow-shutter signal; and
  a detect-don't-write-signal circuit to detect the don't-write signal, wherein the separate memory maintains a stored image frame in the separate memory when the detect-don't-write-signal circuit detects the don't-write signal.

33. The system recited in claim 29 wherein the write control signal is separate from said one video signal.

34. The system recited in claim 29 wherein the write control signal is superimposed on said one video signal.

35. The system recited in claim 29 wherein a control signal within said bidirectional signaling is implemented through a unique voltage level superimposed on said one video signal.

36. The system recited in claim 29 wherein a control signal within said bidirectional signaling is a pulse occurring during a vertical blanking interval of said one video signal.

37. The system recited in claim 36 wherein said pulse has one or more predefined pulse widths that specify respective operating modes of said one image capture device.

* * * * *